U S009511766B2

United States Patent
Sudou et al.

(10) Patent No.: US 9,511,766 B2
(45) Date of Patent: Dec. 6, 2016

(54) INTER-VEHICLE CONTROL APPARATUS

(71) Applicant: DENSO CORPORATION, Kariya, Aichi-pref. (JP)

(72) Inventors: Takuma Sudou, Obu (JP); Jin Kurumisawa, Obu (JP); Toyohito Nozawa, Aichi-ken (JP); Tatsuya Namikiri, Seoul (KR)

(73) Assignee: DENSO CORPORATION, Kariya, Aichi-pref. (JP)

( * ) Notice: Subject to any disclaimer, the term of this patent is extended or adjusted under 35 U.S.C. 154(b) by 189 days.

(21) Appl. No.: 14/575,061

(22) Filed: Dec. 18, 2014

(65) Prior Publication Data

US 2015/0175160 A1 Jun. 25, 2015

(30) Foreign Application Priority Data

Dec. 20, 2013 (JP) ................. 2013-263938

(51) Int. Cl.
| | |
|---|---|
| *B60T 7/12* | (2006.01) |
| *G05D 1/00* | (2006.01) |
| *B60W 30/09* | (2012.01) |
| *B60W 30/16* | (2012.01) |
| *B60W 30/095* | (2012.01) |

(52) U.S. Cl.
CPC .......... *B60W 30/09* (2013.01); *B60W 30/0956* (2013.01); *B60W 30/16* (2013.01); *B60W 2550/302* (2013.01); *B60W 2550/308* (2013.01); *B60W 2720/106* (2013.01); *B60W 2750/308* (2013.01)

(58) Field of Classification Search
USPC ............................ 701/1, 70, 93, 94; 340/435
See application file for complete search history.

(56) References Cited

U.S. PATENT DOCUMENTS

| | | |
|---|---|---|
| 6,418,370 B1 | 7/2002 | Isogai et al. |
| 2004/0140143 A1 | 7/2004 | Saeki et al. |
| 2006/0025918 A1 | 2/2006 | Saeki |

FOREIGN PATENT DOCUMENTS

| | | |
|---|---|---|
| JP | 2000-108720 | 4/2000 |
| JP | 2004-217175 | 8/2004 |
| JP | 2006-044326 | 2/2006 |

OTHER PUBLICATIONS

Japanese Office Action dated Dec. 8, 2015 in corresponding Japanese Application No. 2013-263938 with English translation.

*Primary Examiner* — Adam Tissot
(74) *Attorney, Agent, or Firm* — Harness, Dickey & Pierce, P.L.C.

(57) ABSTRACT

In an inter-vehicle control apparatus, a controller performs acceleration control of an own vehicle, based on an actual inter-vehicle physical quantity and a target inter-vehicle physical quantity. A limiter sets a limit value for a target jerk during the acceleration control. A detector detects an occurrence of at least one of: an event in which the inter-vehicle distance becomes discontinuously shorter; and an event in which a target inter-vehicle distance corresponding to the target inter-vehicle physical quantity becomes discontinuously longer. A determiner determines a risk of collision with the preceding vehicle, based on an operation state of the preceding vehicle in relation to the own vehicle. When at least one of the events is detected, the limiter sets the limit value to a value based on the risk of collision such that change in deceleration of the own vehicle is kept lower as the risk of collision decreases.

15 Claims, 5 Drawing Sheets

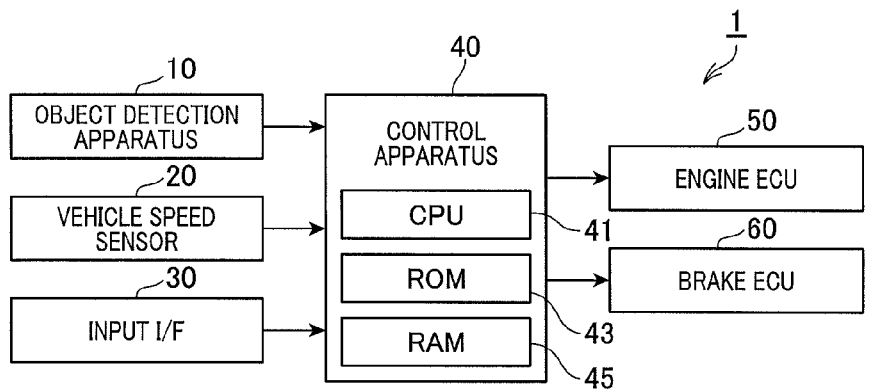
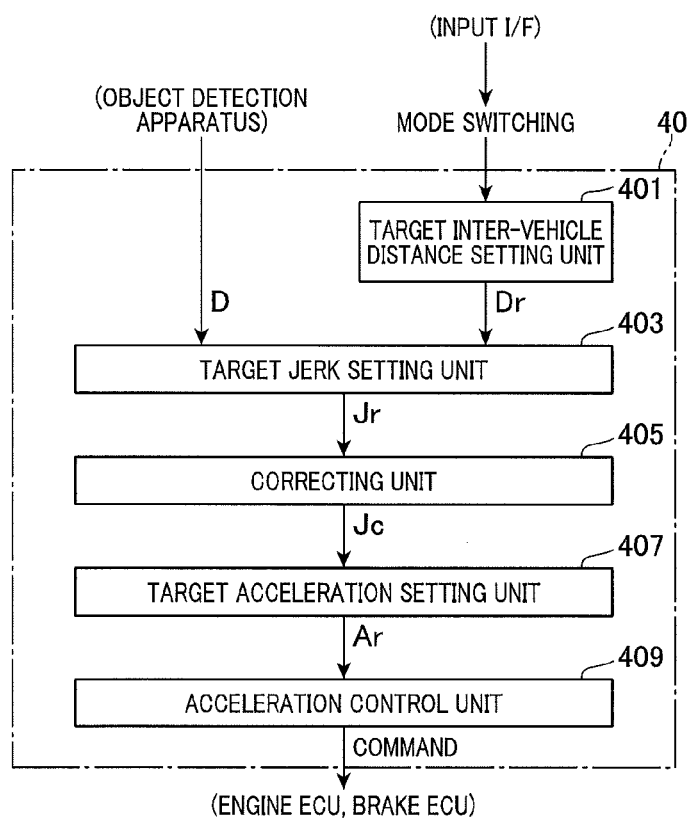

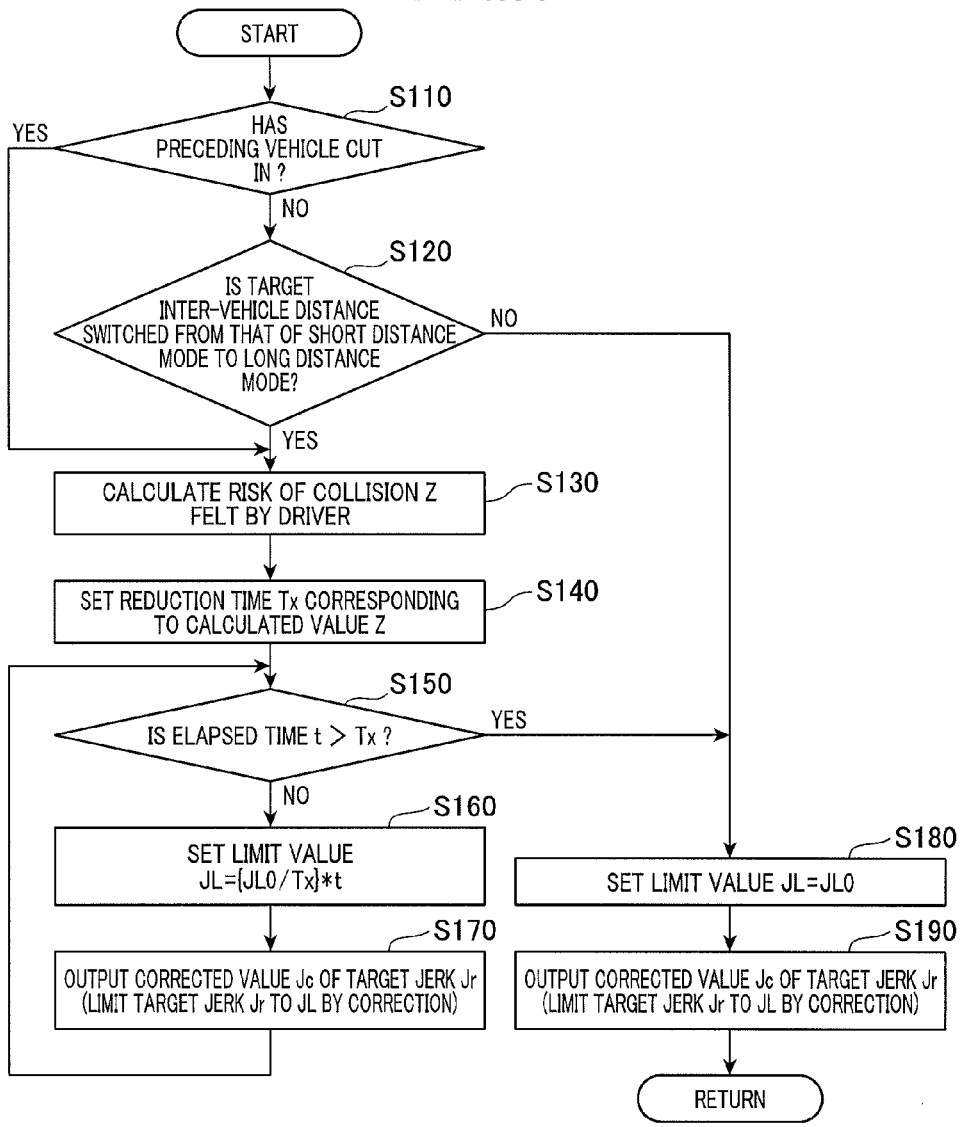

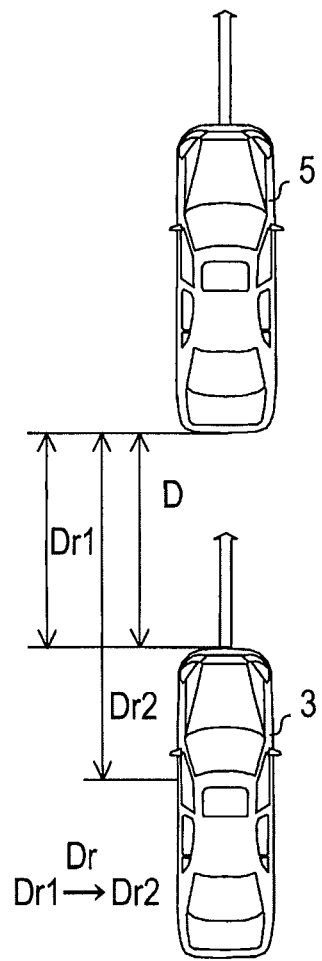

Z1<Z2

INTER-VEHICLE CONTROL APPARATUS

CROSS-REFERENCE TO RELATED APPLICATION

This application is based on and claims the benefit of priority from Japanese Patent Application No. 2013-263938, filed Dec. 20, 2013, the disclosure of which is incorporated herein in its entirety by reference.

BACKGROUND

Technical Field

The present invention relates to an inter-vehicle control apparatus.

Related Art

An inter-vehicle control apparatus that controls an inter-vehicle distance between an own vehicle and a preceding vehicle is known in related art (for example, refer to JP-A-2000-108720). For example, the inter-vehicle control apparatus detects the inter-vehicle distance between an own vehicle and a preceding vehicle using a radar apparatus. Based on the detected inter-vehicle distance, the inter-vehicle control apparatus then performs acceleration control of the vehicle so that the inter-vehicle distance becomes closer to a target inter-vehicle distance. In another example, the inter-vehicle control apparatus controls the inter-vehicle distance by performing acceleration control of the vehicle so that an inter-vehicle time, which is derived by dividing the detected inter-vehicle distance by the speed of the own vehicle, becomes closer to a target inter-vehicle time.

In the above-described related art, the driver may perform an override operation, thereby approaching the preceding vehicle. An actual inter-vehicle physical quantity corresponding to the detected inter-vehicle distance or inter-vehicle time may become smaller than a target inter-vehicle physical quantity corresponding to the target inter-vehicle distance or inter-vehicle time.

In this instance, the target inter-vehicle physical quantity is changed so as to become closer to the actual inter-vehicle physical quantity, and then is gradually increased over time, thereby controlling the degree of deceleration of the vehicle. The target inter-vehicle physical quantity is changed to become closer to the target inter-vehicle physical quantity that should actually be realized, as the relative speed between the own vehicle and the preceding vehicle decreases. The target inter-vehicle physical quantity is changed to become closer to the actual inter-vehicle physical quantity, as the relative speed between the own vehicle and the preceding vehicle increases.

In the related art, the degree of deceleration is suppressed as described above, and then, driving experience is improved. The following can be considered as instances in which the actual inter-vehicle physical quantity becomes smaller than the target inter-vehicle physical quantity. For example, a new preceding vehicle cuts in ahead of the own vehicle. Alternatively, the target inter-vehicle physical quantity is changed to a large value as a result of change in operating mode.

In the above-mentioned related art, the degree of deceleration is suppressed by the target inter-vehicle physical quantity being changed. For example, when a new preceding vehicle cuts in ahead of the own vehicle and the inter-vehicle distance discontinuously changes, an unnecessarily large degree of deceleration may occur. The following can be given as an example of when an unnecessarily large degree of deceleration occurs. For example, an excessively large amount of deceleration, which is disproportionate to the risk of collision with the preceding vehicle felt by the driver, may occur, thereby causing the driver some discomfort. In this way, the above-mentioned related art has room for improvement regarding the driving feeling.

SUMMARY

It is thus desired to provide an inter-vehicle control apparatus that is capable of actualizing deceleration behavior of a vehicle that is suitable for feeling of a driver.

An exemplary embodiment of the present disclosure provides an inter-vehicle control apparatus that is mounted to a vehicle and includes a control unit, a limiting unit, a detection unit, and a determining unit.

The control apparatus performs acceleration control of an own vehicle based on an actual inter-vehicle physical quantity and a target inter-vehicle physical quantity. The target inter-vehicle physical quantity is a target value of the actual inter-vehicle physical quantity. The actual inter-vehicle physical quantity is a detected value of a physical quantity corresponding to an inter-vehicle distance between the own vehicle and a preceding vehicle.

The limiting unit sets a limit value for a target jerk during the acceleration control by the control apparatus. The detection unit detects an occurrence of at least one of: (i) an event (first event) in which the inter-vehicle distance becomes discontinuously shorter; and (ii) an event (second event) in which a target inter-vehicle distance corresponding to the target inter-vehicle physical quantity becomes discontinuously longer. An example of the first event may include an event in which a new preceding vehicle cuts in ahead of the own vehicle. An example of the second event may include an event in which the target inter-vehicle distance is changed to a value that is higher than the current value as a result of change in operating mode of the vehicle.

The determining unit determines the risk of collision with the preceding vehicle felt by the driver of the own vehicle. For example, the determining unit determines a risk of collision, based on the operation state of the preceding vehicle in relation to the own vehicle. In addition, the determining unit may be configured to determine the risk of collision based on a relative speed between the preceding vehicle and the own vehicle.

When the detection unit detects the above-described events, the limiting unit sets the limit value of the target jerk to a value based on the risk of collision determined by the determining unit. As a result, the change in deceleration of the own vehicle can be kept lower as the determined risk of collision decreases.

In the inter-vehicle control apparatus of the exemplary embodiment, the target jerk is provided with a limit value, as described above. Thus, even when a new preceding vehicle cuts in ahead of the own vehicle and the actual inter-vehicle physical quantity discontinuously changes, sudden deceleration caused by a discrepancy between the actual inter-vehicle physical quantity and the target inter-vehicle physical quantity can be suppressed.

In addition, in the inter-vehicle control apparatus, based on the risk of collision with the preceding vehicle felt by the driver, the change in deceleration is kept lower as the risk of collision decreases. When the driver feels a high risk of collision, the required sudden deceleration of the own vehicle is generated. When the driver does not feel a high risk of collision, poor driving feeling due to sudden deceleration is suppressed. Therefore, in the inter-vehicle control apparatus, preferable vehicle deceleration behavior that is suitable for feeling of the driver can be actualized.

When the at least one of the first event and the second event is detected, the limiting unit may set, as the limit value of the target jerk, the upper limit value of a target deceleration gradient such that: (i) the upper limit value gradually increases from an initial value, and (ii) a slope of the upper limit value is kept lower as the risk of collision determined by the determining unit decreases.

As a result of the inter-vehicle control apparatus being configured in this way, sudden deceleration caused by the occurrence of the above-described events at an early stage of the events can be suppressed. In addition, the actual inter-vehicle physical quantity can be changed to the target inter-vehicle physical quantity at a speed based on the risk of collision felt by the driver.

Furthermore, when the at least one of the first event and the second event is detected, the limiting unit may set the upper limit value of the deceleration gradient such that: (i) the upper limit value gradually increases from an initial value to a standard value over time; and (ii) an amount of time until the upper limit value of the deceleration gradient changes from the initial value to the standard value becomes longer as the risk of collision decreases. As a result of a technique for changing the limit value of the target jerk in this way, the limit value can be appropriately adjusted by a simple process. Deceleration behavior preferable to the feeling of the driver can be actualized.

BRIEF DESCRIPTION OF THE DRAWINGS

In the accompanying drawings:

FIG. 1 is a block diagram of a configuration of an on-board system according to an embodiment;

FIG. 2 is a block diagram of functions actualized by a control apparatus of the on-board system shown in FIG. 1;

FIG. 3 is a flowchart of a process actualized by a correcting unit included in the functions of the control apparatus shown in FIG. 2;

FIG. 4 is a diagram for explaining a relationship between an actual inter-vehicle distance and a target inter-vehicle distance before and after a target inter-vehicle distance is changed;

DESCRIPTION OF EMBODIMENTS

Figure 5:
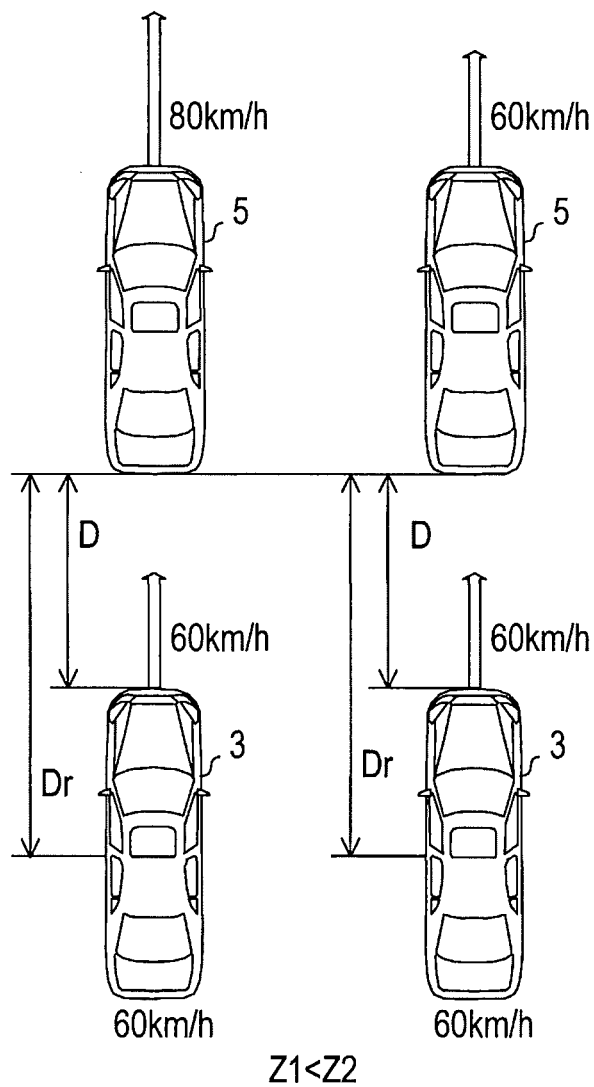
FIG. 5 is a diagram for explaining a correspondence between a driving state of a preceding vehicle and a risk of collision.

An example of the present invention will hereinafter be described with reference to the drawings.

An on-board system 1 of the present example is shown in FIG. 1. The on-board system 1 is mounted to a vehicle, such as a two-wheel or four-wheel automobile. The on-board system 1 is configured to control the inter-vehicle distance between an own vehicle 3 and a preceding vehicle 5 by controlling the engine and the brake. The on-board system 1 mainly includes an object detection apparatus 10, a vehicle speed sensor 20, an input interface 30, a control apparatus 40, an engine electronic control unit (ECU) 50, and a brake ECU 60. The apparatuses composing the on-board system 1 are connected to one another via an in-vehicle network.

Alternatively, the apparatuses are directly connected to the control apparatus 40 via dedicated cables.

The object detection apparatus 10 provides a function as a so-called radar apparatus. The object detection apparatus 10 emits exploration waves (such as optical waves or electromagnetic waves) ahead of the own vehicle 3, and then receives reflection waves of the exploration waves, thereby detecting an object ahead. The object detection apparatus 10 detects the distance from the own vehicle 3 to the object ahead, the orientation of the object ahead in relation to the own vehicle 3, and the relative speed of the object ahead in relation to the own vehicle 3.

The object detection apparatus 10 may be configured to further include a camera that captures images of the area ahead of the own vehicle 3. In this instance, the object detection apparatus 10 may be configured to detect an object ahead based on the images captured by the camera. The object detection apparatus 10 may then determine the type of object. The object detection apparatus 10 may also determine the attitude of the object in relation to the cruising lane of the own vehicle 3.

The object detection apparatus 10 detects the preceding vehicle 5 based on the detection results described above. The preceding vehicle 5 is a vehicle that is traveling ahead of the own vehicle 3, in the same lane as the own vehicle 3. The object detection apparatus 10 identifies a distance (in other words, the inter-vehicle distance) D and a relative speed W of the preceding vehicle 5 in relation to the own vehicle 3. The object detection apparatus 10 inputs the information on the inter-vehicle distance D and the relative speed W to the control apparatus 40.

Meanwhile, the vehicle speed sensor 20 detects the vehicle speed V of the own vehicle 3. The vehicle speed sensor 20 then inputs the speed information to the control apparatus 40. In addition, the input interface 30 inputs operation information on operations performed by the driver to the control apparatus 40. The input interface 30 includes, as switches that are operable by the driver, a switch for inputting an execution command for an inter-vehicle control process and a switch for switching operating modes.

The control apparatus 40 starts the inter-vehicle control process when the execution command is inputted from the input interface 30. In the inter-vehicle control process, the control apparatus 40 controls the inter-vehicle distance D to a target inter-vehicle distance Dr based on the information on the inter-vehicle distance D and the relative speed W inputted from the object detection apparatus 10, and the vehicle speed V of the own vehicle 3 inputted from the vehicle speed sensor 20.

The control apparatus 40 includes a central processing unit (CPU) 41, a read-only memory (ROM) 43, and a random access memory (RAM) 45. The ROM 43 stores therein various programs. The RAM 45 is used as a work area when the CPU 41 performs processes. The control apparatus 40 actualizes various functions required for inter-vehicle control by the CPU 41 performing various processes based on the above-described programs. When performing the inter-vehicle control process, the control apparatus 40 inputs, to the engine ECU 50 or the brake ECU 60, a drive command or a brake command to control the acceleration A of the own vehicle.

In the present specification, "acceleration" in the direction in which the own vehicle 3 accelerates ahead is set to a positive value. Conversely, "acceleration" in the direction of deceleration is set to a negative value. "Deceleration" in the present specification refers to a value obtained by inverting the sign (positive/negative) of the "acceleration". The "relative speed" of the preceding vehicle 5 in relation to the own vehicle 3 is set to a positive value when the speed of the preceding vehicle 5 is higher than the speed of the own vehicle 3. The "relative speed" is set to a negative value when the speed of the preceding vehicle 5 is lower than the speed of the own vehicle 3.

The engine ECU 50 controls the engine so that the wheels generate a driving torque that is based on the above-described drive command from the control apparatus 40. The brake ECU 60 controls the hydraulic brake so that the wheels generate a braking torque that is based on the brake command from the control apparatus 40.

Next, a detailed configuration of the control apparatus 40 will be described. As a result of the CPU 41 performing various processes based on the programs, the control apparatus 40 functions as a target inter-vehicle distance setting unit 401, a target jerk setting unit 403, a correcting unit 405, a target acceleration setting unit 407, and an acceleration control unit 409, as shown in FIG. 2. However, the control apparatus 40 may be configured as a dedicated circuit that includes a circuit group for functioning as these units.

The target inter-vehicle distance setting unit 401 sets the target inter-vehicle distance Dr between the own vehicle 3 and the preceding vehicle 5. Specifically, the target inter-vehicle distance setting unit 401 sets the target inter-vehicle distance Dr corresponding to the operating mode selected by the driver, based on a command from the driver that is inputted via the input interface 30. The operating modes include short distance mode and long distance mode.

When short distance mode is selected as the operating mode, the target inter-vehicle distance setting unit 401 sets, as the target inter-vehicle distance Dr, a target inter-vehicle distance Dr1 for short distance mode. The target inter-vehicle distance Dr1 for short distance mode is set in advance. On the other hand, when long distance mode is selected as the operating mode, the target inter-vehicle distance setting unit 401 sets a target inter-vehicle distance Dr2 for long distance mode as the target inter-vehicle distance Dr. The target inter-vehicle distance Dr2 for long distance mode is longer than the target inter-vehicle distance Dr1 for short distance mode.

The target jerk setting unit 403 sets a target jerk Jr for bringing the inter-vehicle distance D closer to the target inter-vehicle distance Dr, based on the inter-vehicle distance D detected by the object detection apparatus 10 and the target inter-vehicle distance Dr. In addition to the inter-vehicle distance D and the target inter-vehicle distance Dr, the target jerk Jr can be set using the speed V and the acceleration A of the own vehicle 3.

In the present specification, the actual inter-vehicle distance, jerk, acceleration, and speed are indicated, rather than the target values, when simply expressed as inter-vehicle distance, jerk, acceleration, and speed. The acceleration A of the own vehicle 3 can be determined by a time derivative of the speed V detected by the vehicle speed sensor 20. The jerk Jr can be determined by a time derivative of the acceleration A.

A following technique is already known. In this known technique, the target acceleration Ar or the target jerk Jr are set to bring the inter-vehicle distance D closer to the target inter-vehicle distance Dr. The inter-vehicle distance D is controlled to the target inter-vehicle distance Dr based on the target acceleration Ar or the target jerk Jr. The target jerk setting unit 403 can set the target jerk Jr based on this known technique.

The correcting unit 405 corrects the target jerk Jr set by the target jerk setting unit 403. The correcting unit 405 then inputs the corrected target jerk Jc to the target acceleration setting unit 407. Specifically, when the target jerk Jr inputted from the target jerk setting unit 403 is less than a target jerk limit value (referred to, hereinafter, as simply a "limit value") JL that is set to a negative value (Jr<JL), the correcting unit 405 includes a limiting unit that corrects the target jerk Jr to the limit value JL. The correcting unit 405 then inputs the corrected target jerk Jc=JL to the target acceleration setting unit 407.

On the other hand, when the target jerk Jr inputted from the target jerk setting unit 403 is the limit value JL or higher (Jr≥JL), the correcting unit 405 does not correct the target jerk Jr. The correcting unit 405 sets the corrected target jerk Jc to the same value as the target jerk Jr. The correcting unit 405 then inputs the corrected target jerk Jc=Jr to the target acceleration setting unit 407. The sign-inverted value (−JL) of the limit value JL corresponds to an upper limit value of a target deceleration gradient (time derivative of a target deceleration).

In the on-board system 1 of the present example, when the target jerk Jc is a negative value, the deceleration of the own vehicle 3 increased more quickly, as the target jerk Jc decreases (as the absolute value increases).

Based on the corrected target jerk Jc corrected by the correcting unit 405, the target acceleration setting unit 407 sets the target acceleration Ar corresponding to the target jerk Jc. Based on the acceleration A of the own vehicle 3 and the target acceleration Ar set by the target acceleration setting unit 407, the acceleration control unit 409 calculates the required drive torque or brake torque to bring the acceleration A of the own vehicle 3 closer to the target acceleration Ar. The acceleration control unit 409 then inputs, to the engine ECU 50 or the brake ECU 60, a drive command or a brake command to actualize the drive torque or the brake torque. As a result, the acceleration control unit 409 controls the acceleration A of the own vehicle 3 to the target acceleration Ar.

When the process shown in FIG. 3 is started, the correcting unit 405 determines whether or not a cut-in event by a preceding vehicle 5 has occurred (step S110). The cut-in event by a preceding vehicle 5 refers to an event in which a new preceding vehicle 5 enters the area ahead of the own vehicle 3.

When determined that a cut-in event by a preceding vehicle 5 has occurred, the point of reference for the inter-vehicle distance D switches from the existing preceding vehicle 5 to the new preceding vehicle 5 that has entered between the own vehicle 3 and the existing preceding vehicle 5. The inter-vehicle distance D between the own vehicle 3 and the preceding vehicle 5 becomes discontinuously shorter. As a result, a discrepancy occurs between the inter-vehicle distance D and the target inter-vehicle distance Dr. The target jerk setting unit 403 sets a target jerk Jr that has a high target deceleration gradient to reduce the discrepancy.

In other words, the target jerk setting unit 403 sets the target jerk Jr to a negative value that has a high absolute value. In the present example, the target jerk Jr is corrected by a special method in a situation such as this. Therefore, the above-described determination is made. The determination regarding whether or not the cut-in event has occurred can be actualized by the object detection apparatus 10 inputting information on the preceding vehicle 5 required for determination to the control apparatus 40.

When determined that the cut-in event has occurred (Yes at step S110), the correcting unit 405 proceeds to step S130.

When determined that the cut-in event has not occurred (No at step S110), the correcting unit 405 proceeds to step S120.

After proceeding to step S120, the correcting unit 405 determines whether or not a switching event has occurred. The switching event refers to when the operating mode for inter-vehicle control is switched from the above-described short distance mode to long distance mode. The determination can be actualized by monitoring of the operation information from the input interface 30.

As shown in FIG. 4, as a result of the switching event, the target inter-vehicle distance Dr is discontinuously switched from the target inter-vehicle distance Dr=Dr1 in short distance mode to the target inter-vehicle distance Dr=Dr2 in long distance mode. A discrepancy occurs between the inter-vehicle distance D and the target inter-vehicle distance Dr. As a result, in a manner similar to that when the cut-in event by the preceding vehicle 5 occurs, the target jerk setting unit 403 sets the target jerk Jr that a high target deceleration gradient to reduce the discrepancy.

Therefore, when determined that the above-described switching event has occurred (Yes at step S120), the correcting unit 405 proceeds to step S130. On the other hand, when determined that the switching event has not occurred (No at step S120), the correcting unit 405 proceeds to step S180.

After proceeding to step S180, the correcting unit 405 sets the limit value JL of the target jerk Jr to a standard value JL0. The standard value JL0 is a negative value that is determined in advance by the designer. Thereafter, based on the limit value JL=JL0, the correcting unit 405 inputs the corrected target jerk Jc corresponding to the target jerk Jr to the target acceleration setting unit 407 (step S190).

In other words, when determined that the target jerk Jr is less than the limit value JL=JL0, the correcting unit 405 corrects the target jerk Jr to the limit value JL=JL0. The correcting unit 405 then inputs the corrected target jerk Jc=JL0 to the target acceleration setting unit 407. On the other hand, when determined that the target jerk Jr is the limit value JL=JL0 or higher, the correcting unit 405 sets the corrected target jerk Jc to the same value as the target jerk Jr. The correcting unit 405 then inputs the corrected target jerk Jc=Jr to the target acceleration setting unit 407. Thereafter, the correcting unit 405 temporarily ends the process shown in FIG. 3.

Conversely, after proceeding to step S130, the correcting unit 405 includes a determining unit that calculates a risk of collision Z. The risk of collision Z refers to the risk of collision between the own vehicle 3 and the preceding vehicle 5 as felt by the driver of the own vehicle 3. Specifically, the risk of collision Z is calculated based on the inter-vehicle distance D between the own vehicle 3 and the preceding vehicle 5, the relative speed W of the preceding vehicle 5 in relation to the own vehicle 3, and the speed V of the own vehicle 3. For example, the risk of collision Z is calculated based on the following expression.

$$Z=\alpha/THW+\beta/TTC$$

$$THW=D/N$$

$$TTC=D/(-W)$$

Here, $\alpha$ and $\beta$ are positive coefficients. In the above-described expression, the risk of collision Z is calculated to be a higher value as the speed V of the own vehicle 3 in relation to the inter-vehicle distance D increases. In addition, the risk of collision Z is calculated to be a higher value as the relative speed W in relation to the inter-vehicle distance D becomes a higher value in the direction (negative direction) in which the preceding vehicle 5 nears the own vehicle 3. The relative speed W in relation to the inter-vehicle distance D indicates the operation state of the preceding vehicle 5. However, the lower limit of the risk of collision Z is zero.

The driver tends to feel a greater risk of collision with the preceding vehicle 5 as the speed V of the vehicle 3 in relation to the inter-vehicle distance D increases. In addition, the driver tends to feel a greater risk of collision with the preceding vehicle 5 as the time to collision TTC with the preceding vehicle 5 become shorter. Therefore, as a result of the risk of collision Z being calculated based on the expression above, an appropriate value can be calculated as the risk of collision felt by the driver.

The left-hand section of FIG. 5 shows an example in which the inter-vehicle distance D is shorter than the target inter-vehicle distance Dr as a result of the cut-in event by the preceding vehicle 5. In the example, the speed of the preceding vehicle 5 is 80 km per hour. The speed of the own vehicle is 60 km per hour. The right-hand section of FIG. 5 shows an example in which the speed of the preceding vehicle 5 is 60 km per hour. The speed of the own vehicle is 60 km per hour.

When the combination of the inter-vehicle distance D and the target inter-vehicle distance Dr is the same in both the first example shown in the left-hand section of FIG. 5 and the second example shown in the right-hand section of FIG. 5, the risk of collision Z=Z1 in the first example is calculated to be a value lower than the risk of collision Z=Z2 in the second example.

In the first example, the relative speed W is a positive value, and the preceding vehicle 5 is moving away from the own vehicle 3. In the second example, the relative speed W is zero. In addition, the risk of collision Z=Z1 in the first example and the risk of collision Z=Z2 in the second example are calculated to be values lower than the risk of collision Z when the relative speed W is a negative value and the own vehicle 3 is nearing the preceding vehicle 5.

After completing the calculation of the risk of collision Z, such as that described above, the correcting unit 405 sets a reduction time Tx based on the calculated risk of collision (step S140). The reduction time Tx refers to the amount of time until the limit value JL is reduced to the standard value JL0.

Figure 6:
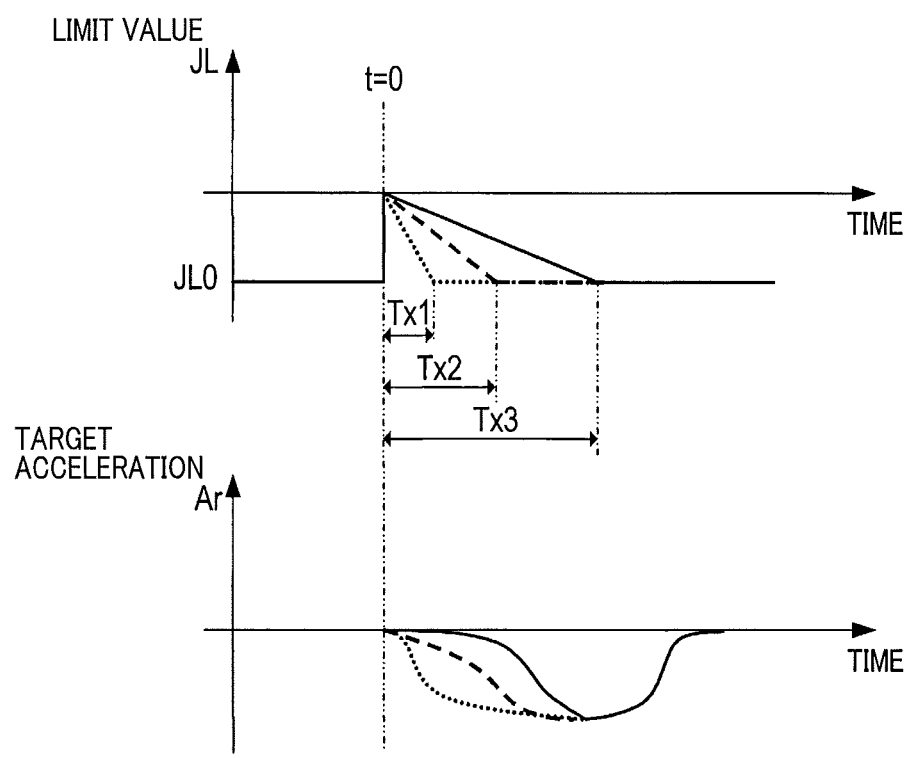
FIG. 6 is a graph of limit values of target jerk and a trajectory of target acceleration.

As shown in the upper section of FIG. 6, in the present example, when the cut-in event by the preceding vehicle 5 and the switching event of the operating mode occur, the limit value JL is gradually changed in a linear manner from the initial value zero to the standard value JL0. In other words, the upper limit value (−JL) of the target deceleration gradient (−Jr) is gradually changed to increase from the initial value zero to the standard value (−JL0). The reduction time Tx corresponds to the amount of time until the limit value JL is changed from the initial value zero to the standard value JL0 in this way.

The dotted line shown in the graph indicating time t in relation to limit value JL, shown in the upper section of FIG. 6, is the trajectory of the limit value JL when the reduction time Tx is a value Tx1. The broken line is the trajectory of the limit value JL when the reduction time is a value Tx2 that is greater than the value Tx1. The solid line is the trajectory of the limit value JL when the reduction time is a value Tx3 that is greater than the value Tx2.

Meanwhile, the dotted line shown in the graph indicating time t in relation to target acceleration Ar, shown in the lower section of FIG. 6, is an example of the target acceleration Ar when the reduction time Tx is the value Tx1. The broken line is an example of the target acceleration Ar when the reduction time Tx is the value Tx2. The solid line is an example of the target acceleration Ar when the reduction time Tx is the value Tx3.

Figure 7:
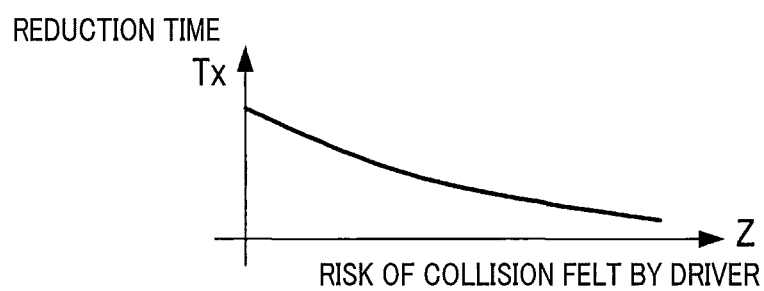
FIG. 7 is a graph of the correspondence between a risk of collision and a relaxation time.

As shown in FIG. 7, the reduction time Tx is set so as to be a monotonically non-increasing function or a monotonically decreasing function in relation to the risk of collision Z. In this relationship, the reduction time Tx is set to a higher value as the risk of collision Z decreases. However, the correspondence between the risk of collision Z and the reduction time Tx shown in FIG. 7 is an example. Various relationships in which the reduction time Tx increases as the risk of collision Z decreases can be used.

In the present example, the reduction time Tx is set to a higher value as the risk of collision Z decreases. Therefore, the slope of the limit value JL (in other words, the upper limit value of the target deceleration gradient) is kept lower as the risk of collision Z decreases. The target acceleration (target deceleration) is gradually changed. As a result, the jerk J (deceleration gradient) in the own vehicle 3 immediately after the occurrence of the above-described events can be suppressed. As shown in the lower section of FIG. 6, unnecessary sudden deceleration of the own vehicle 3 can be prevented. The driving experience can be improved.

At step S140, the reduction time Tx based on the risk of collision Z calculated at step S130 is set based on a function indicating the correspondence between the risk of collision Z and the reduction time Tx that has been set in advance. However, at step S140, the reduction time Tx based on the risk of collision Z calculated at step S130 may be set based on a table indicating the correspondence between the risk of collision Z and the reduction time Tx that has been stored in advance in the Rom 43. The function and the table can be generated based on the results of experiments related to driving experience.

The control apparatus 40 subsequently proceeds to step S150. The control apparatus 40 determines whether or not elapsed time t from the occurrence of the above-described cut-in event or switching event has exceeded the reduction time Tx. When determined that the elapsed time t has not exceeded the reduction time Tx (No at step S150), the control apparatus 40 proceeds to step S160. As a result, the control apparatus 40 repeatedly performs the processes at steps S160 and S170 until the elapsed time t exceeds the reduction time Tx.

At step S160, the control apparatus 40 calculates and sets the limit value JL using by following expression, based on the standard value JL0, the elapsed time t, and the reduction time Tx.

$$JL=(JL0/Tx) \cdot t$$

At step S170, when determined that the target jerk Jr is less than the limit value JL (Jr<JL), the correcting unit 405 corrects the target jerk Jr to the limit value JL. The correcting unit 405 then inputs the corrected target jerk Jc=JL=(JL0/Tx)·t to the target acceleration setting unit 407. When determined that the target jerk Jr is the limit value JL or higher (Jr≥JL), the correcting unit 405 sets the corrected target jerk Jc to the same value as the target jerk Jr. The correcting unit 405 then inputs the corrected target jerk Jc=Jr to the target acceleration setting unit 407.

In this way, when the above-described events occur, the correcting unit 405 sets the limit value JL so as to gradually change from the initial value zero to the standard value JL0 over time. Sudden deceleration is thereby suppressed. In other words, the correcting unit 405 sets the upper limit value (=J1) of the target deceleration gradient so as to gradually change from the initial value zero to the standard value (−JL0). The correcting unit 405 thereby corrects the target jerk Jr so as to suppress sudden deceleration.

Then, when determined that the elapsed time t has exceeded the reduction time Tx (Yes at step S150), the correcting unit 405 sets the limit value JL to the standard value JL0 (step S180). The correcting unit 405 corrects the target jerk Jr based on the standard value JL0 (step S190).

The on-board system 1 of the present example is as described above. In the on-board system 1, when the above-described events occur, the limit value JL based on the risk of collision Z with the preceding vehicle 5 felt by the driver is set for the target jerk Jr. As a result of the limit value JL being provided, the jerk in the own vehicle 3 can be limited regardless of the discrepancy between the inter-vehicle distance D and the target inter-vehicle distance Dr. The occurrence of sudden deceleration that is caused by the discrepancy and is disproportionate to the risk felt by the driver can be prevented from occurring in the own vehicle 3.

In particular, in the on-board system 1, based on the risk of collision Z with the preceding vehicle 5 felt by the driver, the change in deceleration is kept lower as the risk of collision Z decreases. Therefore, when the driver feels a high risk of collision, the required sudden deceleration of the own vehicle 3 is generated. When the driver does not feel a high risk of collision, poor driving experience due to sudden deceleration is suppressed. Therefore, in the on-board system 1, preferable vehicle deceleration behavior that is suited for feeling of the driver can be actualized.

In addition, in the on-board system 1, the risk of collision Z is calculated based on the relative speed W between the preceding vehicle 5 and the own vehicle 3. Therefore, the risk of collision Z felt by the driver can be appropriately calculated. In particular, in the on-board system 1, based on the actual inter-vehicle distance D, the speed V of the own vehicle 3, and the relative speed W, the risk of collision Z is calculated to be a higher value as the speed V of the own vehicle 3 in relation to the inter-vehicle distance D increases, and as the relative speed W in relation to the inter-vehicle distance D increases in the direction in which the preceding vehicle 5 nears the own vehicle 3. Therefore, a more appropriate value can be calculated as the risk of collision Z.

In addition, in the on-board system 1, when the above-described events do not occur, the limit value JL is set to the standard value JL0. When the events are detected, the limit value JL is set so that the upper limit value (sign-inversed value of the limit value JL) of the target deceleration gradient is set to gradually increase from the initial value zero to the standard value over time. Furthermore, the limit value JL is set so that the slope of the upper limit value is kept lower as the risk of collision Z decreases.

Therefore, sudden deceleration caused by the occurrence of the above-described events at an early stage of the events can be suppressed. In addition, the inter-vehicle distance D can be changed to the target inter-vehicle distance Dr at a speed based on the risk of collision Z felt by the driver.

The present disclosure is not limited to the above-described example. Various aspects are also possible. For example, instead of the inter-vehicle distance D and the target inter-vehicle distance Dr, the inter-vehicle time (D/V) and the target inter-vehicle time (Dr/V) can be used to perform inter-vehicle control of the own vehicle 3. Here, the inter-vehicle time (D/V) and the target inter-vehicle time (Dr/V) are respectively the inter-vehicle distance D and the target inter-vehicle distance Dr divided by the speed V of the own vehicle 3.

Moreover, in the example described above, the on-board system 1 is mounted in a vehicle that uses an internal combustion engine as a power source. However, the present invention may be mounted in various types of vehicles, such as a vehicle that uses an electric motor as a power source. In addition, the present invention may be applied to an on-board system that performs deceleration control only when the inter-vehicle distance is shorter than the target inter-vehicle distance, without performing acceleration control when the inter-vehicle distance is longer than the target inter-vehicle distance.

In addition, the method for calculating the risk of collision Z felt by the driver is not limited to the above-described expression. For example, the risk of collision Z may be calculated taking into consideration the surrounding road environment, the personality of the driver, and the like, in addition to the operation state of the preceding vehicle 5. For example, uncertainties are stronger regarding the behavior of the preceding vehicle 5 several seconds into the future on a local road, compared to a highway. It is considered that the driver will more easily feel risk. Therefore, increasing the allowable target deceleration gradient may be considered. In addition, information related to the personality of the driver may be acquired from the driver via the input interface 30. The computational expression for the risk of collision Z may be changed. Alternatively, the reduction time Tx in relation to the risk of collision Z may be changed.

Finally, correspondence will be described. The control apparatus 40 corresponds to an example of the inter-vehicle control apparatus. The target jerk setting unit 403, the target acceleration setting unit 407, and the acceleration control unit 409 correspond to an example of control means (equivalent to a control unit or a controller). The functions actualized by steps S110 and S120 performed by the correcting unit 405 correspond to functions actualized by detecting means (equivalent to a detecting unit or a detector). The functions actualized by step S130 correspond to functions actualized by determining means (equivalent to a determining unit or a determiner). The functions actualized by steps S140 to S160 correspond to an example of functions actualized by limiting means (equivalent to a limiting unit or a limiter).

What is claimed is:

1. An inter-vehicle control apparatus mounted to an own vehicle, the inter-vehicle control apparatus comprising:
a control unit that performs acceleration control of the own vehicle based on an actual inter-vehicle physical quantity and a target inter-vehicle physical quantity, where the actual inter-vehicle physical quantity is a detected value of a physical quantity corresponding to an inter-vehicle distance between the own vehicle and a preceding vehicle, and the target inter-vehicle physical quantity is a target value of the actual inter-vehicle physical quantity;
a limiting unit that sets a limit value for a target jerk during the acceleration control;
a detection unit that detects an occurrence of at least one of: (i) a first event in which the inter-vehicle distance becomes discontinuously shorter; and (ii) a second event in which a target inter-vehicle distance corresponding to the target inter-vehicle physical quantity becomes discontinuously longer; and
a determining unit that determines a risk of collision with the preceding vehicle felt by the driver of the own vehicle, based on an operation state of the preceding vehicle in relation to the own vehicle,
when the detection unit detects the at least one of the first event and the second event, the limiting unit setting the limit value for the target jerk to a value based on the risk of collision determined by the determining unit such that a change in deceleration of the own vehicle is kept lower as the determined risk of collision decreases.

2. The inter-vehicle control apparatus according to claim 1, wherein
the determining unit determines the risk of collision, based on a relative speed between the preceding vehicle and the own vehicle.

3. The inter-vehicle control apparatus according to claim 2, wherein
when the at least one of the first event and the second event is detected, the limiting unit sets, as the limit value for the target jerk, an upper limit value of a target deceleration gradient such that: (i) the upper limit value gradually increases from an initial value; and (ii) a slope of the upper limit value is kept lower as the risk of collision determined by the determining unit decreases.

4. The inter-vehicle control apparatus according to claim 3, wherein
when the at least one of the first event and the second event is detected, the limiting unit sets the upper limit value such that: (i) the upper limit value gradually increases from an initial value to a standard value over time; and (ii) an amount of time until the upper limit value of the deceleration gradient changes from the initial value to the standard value becomes longer as the risk of collision decreases.

5. The inter-vehicle control apparatus according to claim 4, wherein
the determining unit determines the risk of collision based on: (i) an inter-vehicle distance between the own vehicle and the preceding vehicle; (ii) a speed of the own vehicle; and (iii) a relative speed between the preceding vehicle and the own vehicle.

6. The inter-vehicle control apparatus according to claim 5, wherein
the determining unit calculates the risk of collision to be a higher value, as the speed of the own vehicle in relation to the inter-vehicle distance increases, and as the relative speed in relation to the inter-vehicle distance becomes a larger value in a direction in which the preceding vehicle nears the own vehicle.

7. The inter-vehicle control apparatus according to claim 6, wherein
the detection unit detects, as the occurrence of the first event in which the inter-vehicle distance becomes discontinuously shorter, an occurrence of an event in which a new preceding vehicle enters the area ahead of the own vehicle.

8. The inter-vehicle control apparatus according to claim 7, wherein
the detection unit detects, as the occurrence of the second event in which a target inter-vehicle distance corresponding to the target inter-vehicle physical quantity becomes discontinuously longer, an occurrence of an event in which the target inter-vehicle distance is changed to a value larger than a current value, as a result of change in operating mode of the vehicle.

9. The inter-vehicle control apparatus according to claim 1, wherein when the at least one of the first event and the second event is detected, the limiting unit sets, as the limit value for the target jerk, an upper limit value of a target deceleration gradient such that: (i) the upper limit value gradually increases from an initial value; and (ii) a slope of the upper limit value is kept lower as the risk of collision determined by the determining unit decreases.

10. The inter-vehicle control apparatus according to claim 9, wherein
when the at least one of the first event and the second event is detected, the limiting unit sets the upper limit value such that: (i) the upper limit value gradually increases from an initial value to a standard value over time; and (ii) an amount of time until the upper limit value of the deceleration gradient changes from the initial value to the standard value becomes longer as the risk of collision decreases.

11. The inter-vehicle control apparatus according to claim 1, wherein
the determining unit determines the risk of collision based on: (i) an inter-vehicle distance between the own vehicle and the preceding vehicle; (ii) a speed of the own vehicle; and (iii) a relative speed between the preceding vehicle and the own vehicle.

12. The inter-vehicle control apparatus according to claim 11, wherein
the determining unit calculates the risk of collision to be a higher value, as the speed of the own vehicle in relation to the inter-vehicle distance increases, and as the relative speed in relation to the inter-vehicle distance becomes a larger value in a direction in which the preceding vehicle nears the own vehicle.

13. The inter-vehicle control apparatus according to claim 1, wherein
the detection unit detects, as the occurrence of the first event in which the inter-vehicle distance becomes discontinuously shorter, an occurrence of an event in which a new preceding vehicle enters the area ahead of the own vehicle.

14. The inter-vehicle control apparatus according to claim 1, wherein
the detection unit detects, as the occurrence of the second event in which a target inter-vehicle distance corresponding to the target inter-vehicle physical quantity becomes discontinuously longer, an occurrence of an event in which the target inter-vehicle distance is changed to a value larger than a current value, as a result of change in operating mode of the vehicle.

15. An inter-vehicle control method comprising:
performing, by a control apparatus of an inter-vehicle control apparatus mounted to an own vehicle, acceleration control of the own vehicle based on an actual inter-vehicle physical quantity and a target inter-vehicle physical quantity, where the actual inter-vehicle physical quantity is a detected value of a physical quantity corresponding to an inter-vehicle distance between the own vehicle and a preceding vehicle, and the target inter-vehicle physical quantity is a target value of the actual inter-vehicle physical quantity;
setting, by a limiting unit of the inter-vehicle control apparatus, a limit value for a target jerk during the acceleration control;
detecting, by a detection unit of the inter-vehicle control apparatus, an occurrence of at least one of: (i) a first event in which the inter-vehicle distance becomes discontinuously shorter; and (ii) a second event in which a target inter-vehicle distance corresponding to the target inter-vehicle physical quantity becomes discontinuously longer;
determining, by a determining unit of the inter-vehicle control apparatus, a risk of collision with the preceding vehicle felt by the driver of the own vehicle, based on an operation state of the preceding vehicle in relation to the own vehicle; and
when the detection unit detects the at least one of the first event and the second event, setting, by the limiting unit, the limit value of the target jerk to a value based on the determined risk of collision such that change in deceleration of the own vehicle is kept lower as the determined risk of collision decreases.

* * * * *